Figure 1:
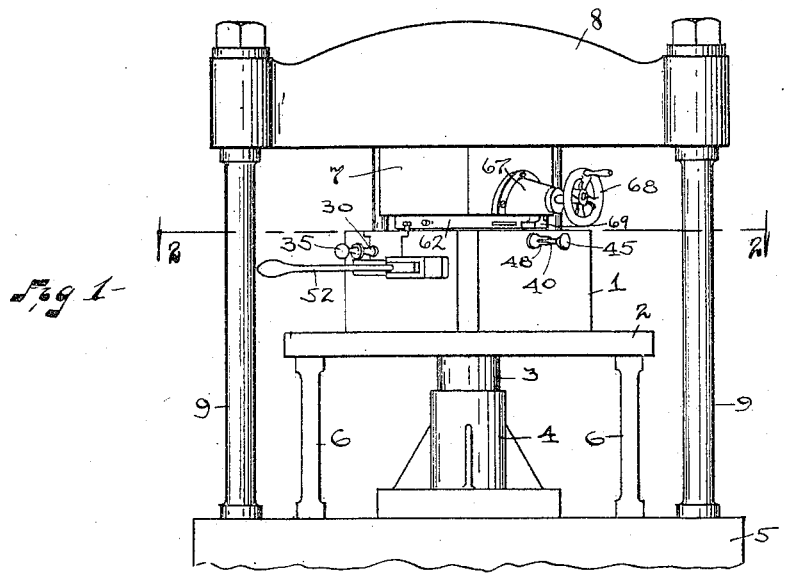

A. H. HEDLY.
MACHINE FOR MAKING TYPOGRAPH MATRICES AND THE LIKE.
APPLICATION FILED AUG. 21, 1914.

1,237,643.

Patented Aug. 21, 1917.
6 SHEETS—SHEET 1.

Witnesses—
O. M. Kappler
H. M. Kathe

Inventor
Arthur H. Hedley
By Fay & Oberlin
Attorneys

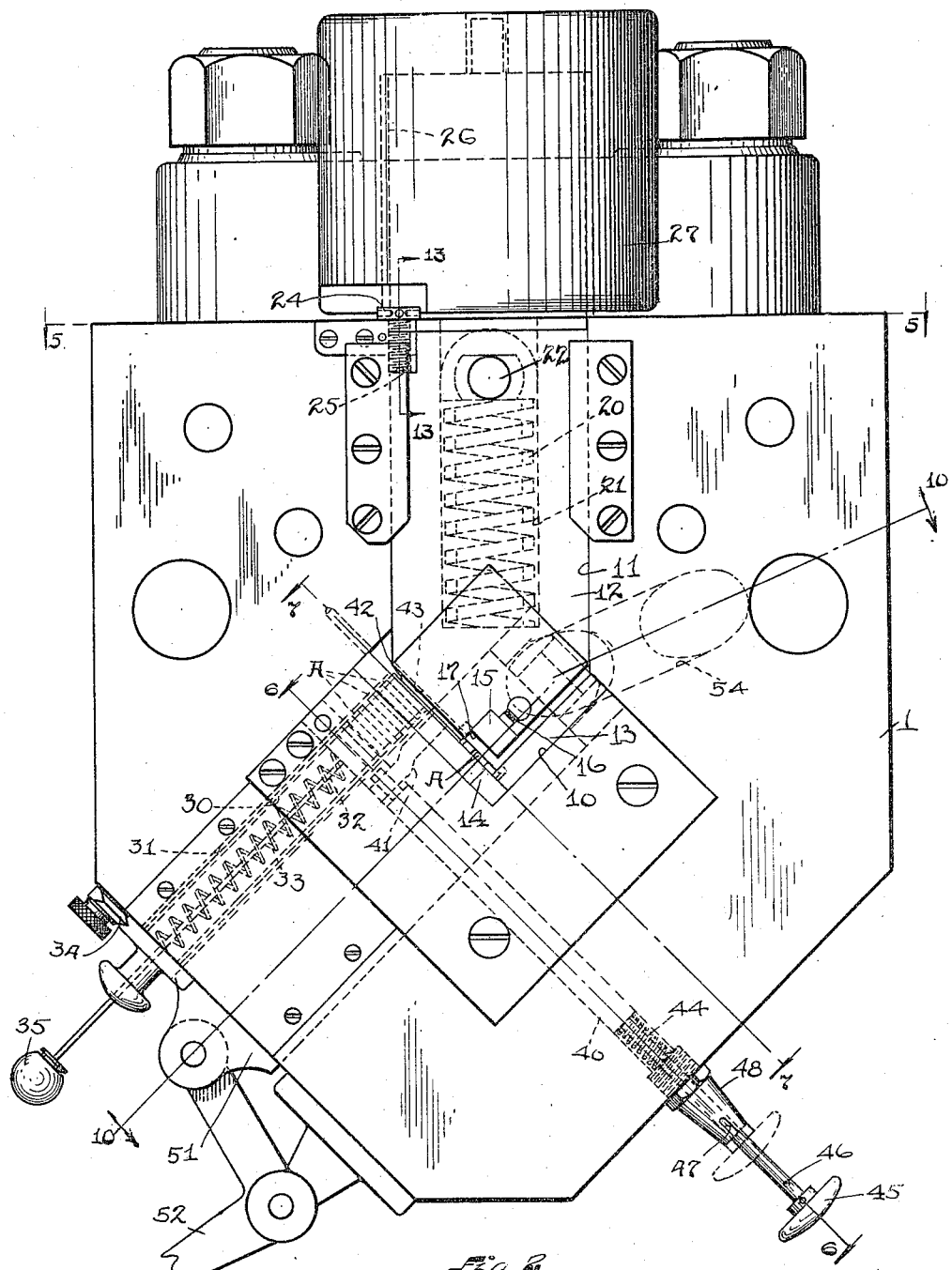

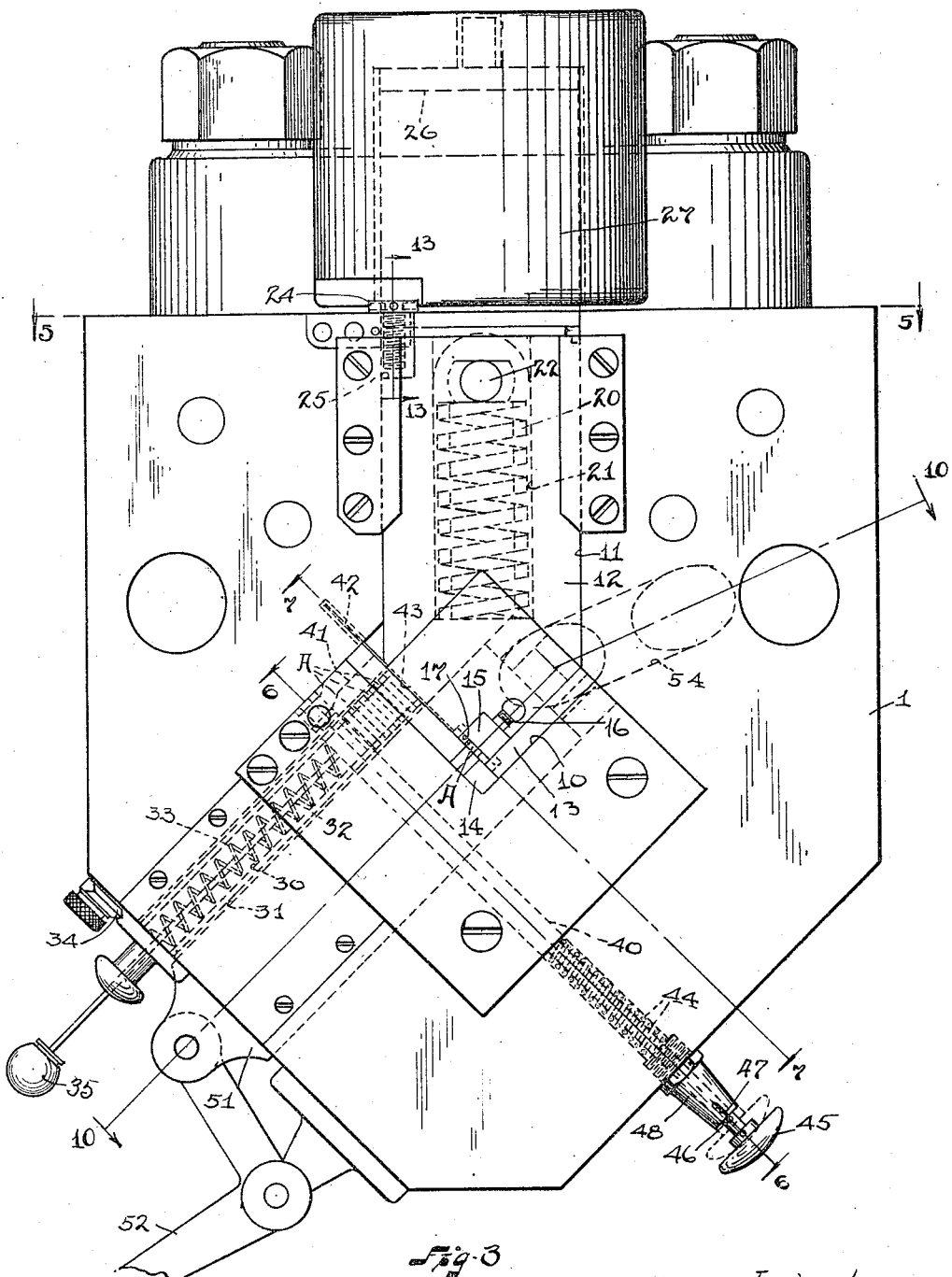

A. H. HEDLY.
MACHINE FOR MAKING TYPOGRAPH MATRICES AND THE LIKE.
APPLICATION FILED AUG. 21, 1914.

1,237,643.

Patented Aug. 21, 1917.
6 SHEETS—SHEET 4.

A. H. HEDLY.
MACHINE FOR MAKING TYPOGRAPH MATRICES AND THE LIKE.
APPLICATION FILED AUG. 21, 1914.
1,237,643.
Patented Aug. 21, 1917.
6 SHEETS—SHEET 5.
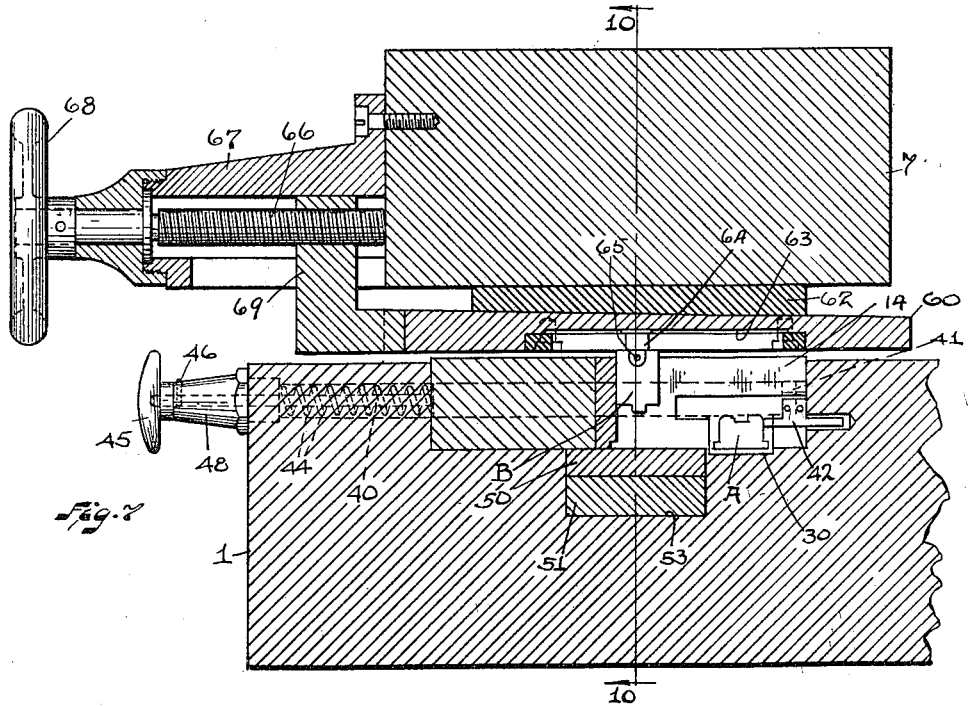
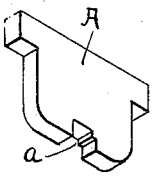
Fig. 17
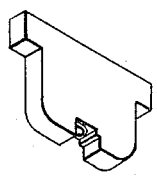
Fig. 18
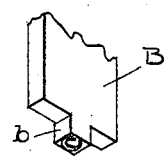
Fig. 19
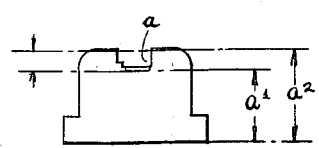
Fig. 20
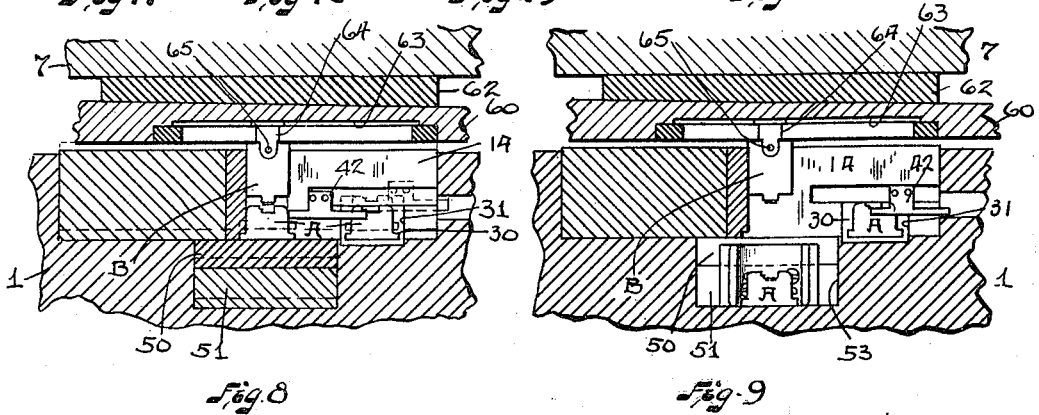
Fig. 8
Fig. 9
Witnesses—
O. M. Kappler
H. M. Kathe
Inventor
Arthur H. Hedly
By Gray and Oberlin
Attorneys A. H. HEDLY.
MACHINE FOR MAKING TYPOGRAPH MATRICES AND THE LIKE.
APPLICATION FILED AUG. 21, 1914.
1,237,643.
Patented Aug. 21, 1917.
6 SHEETS—SHEET 6.
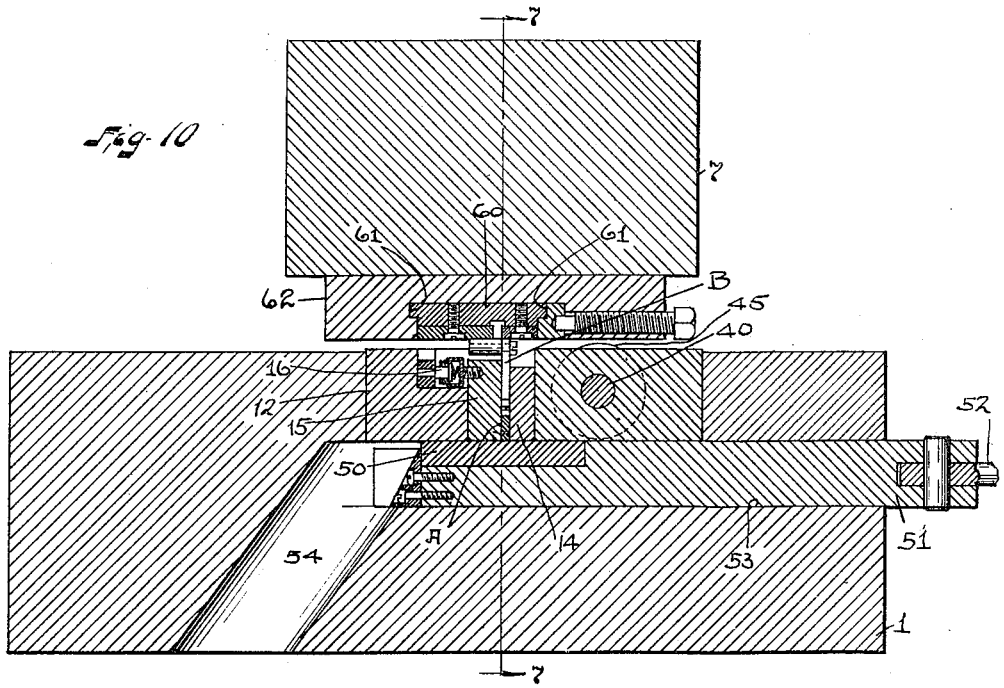
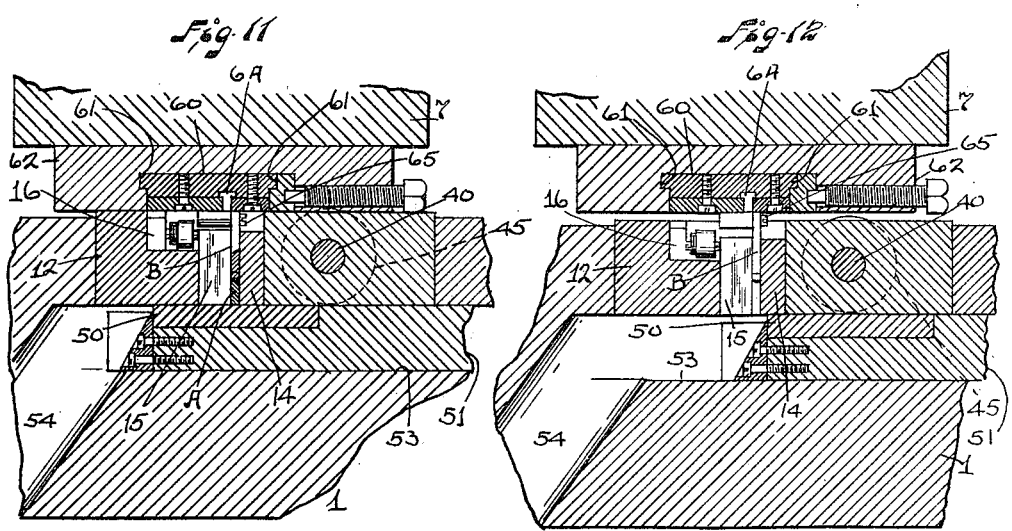
Witnesses—
O. M. Kappler
H. M. Kathe
Inventor
Arthur H. Hedly
By Fay & Oberlin
Attorneys

UNITED STATES PATENT OFFICE.

ARTHUR H. HEDLY, OF CHICAGO, ILLINOIS, ASSIGNOR TO THE LUDLOW TYPOGRAPH COMPANY, OF CLEVELAND, OHIO, A CORPORATION OF MAINE.

MACHINE FOR MAKING TYPOGRAPH-MATRICES AND THE LIKE.

1,237,643.     Specification of Letters Patent.     Patented Aug. 21, 1917.

Application filed August 21, 1914. Serial No. 857,868.

*To all whom it may concern:*

Be it known that I, ARTHUR H. HEDLY, a citizen of the United States, and a resident of Chicago, county of Cook, and State of Illinois, have invented a new and useful Improvement in Machines for Making Typograph-Matrices and the like, of which the following is a specification, the principle of the invention being herein explained and the best mode in which I have contemplated applying that principle, so as to distinguish it from other inventions.

The present improvements, relating as indicated, to the manufacture of matrices for typographs, involve the provision of a driving press or punching mechanism of special design adapted for such manufacture. This press mechanism includes a number of important features of construction, it being understood, of course, that such press mechanism is not necessarily limited in its application to this particular field of use, although designed especially for the purpose of punching or striking character impressions in matrix bars, such as are used in typograph machines.

The object of the invention is to provide means for the rapid and economical manufacture of such matrix bars, and at the same time to produce bars having their matrices as nearly perfect as possible, both in their outline, depth of strike and uniformity of alinement. To the accomplishment of the foregoing and related ends, the invention then consists of the mechanism hereinafter fully described and particularly pointed out in the claims.

The annexed drawings and the following description set forth in detail certain means for carrying out the invention, such disclosed means illustrating, however, but one of various ways in which the principle of the invention may be used.

In said annexed drawings:—

Figure 5:
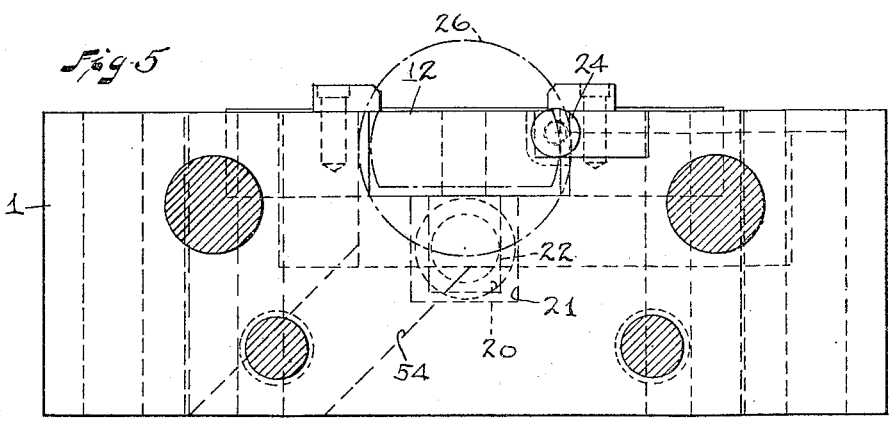
Figure 6:
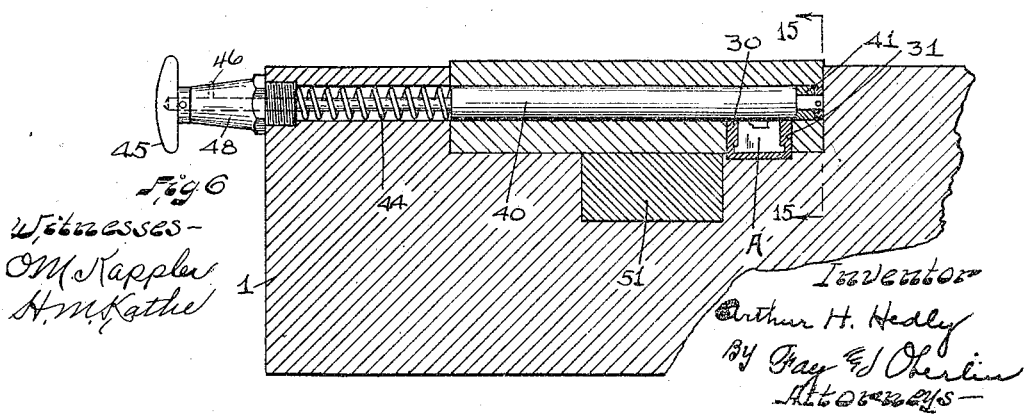
Figure 13:
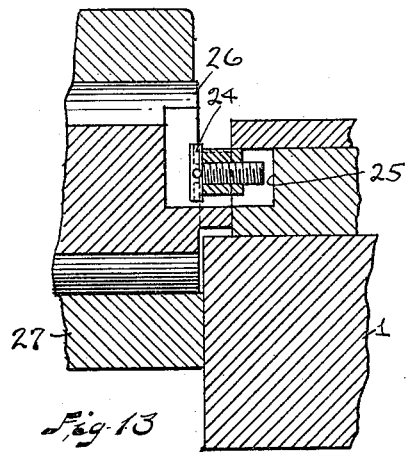
Figure 14:
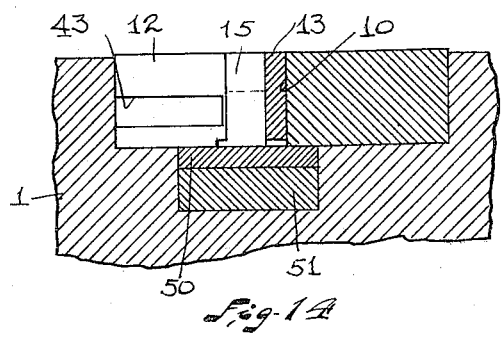
Figure 15:
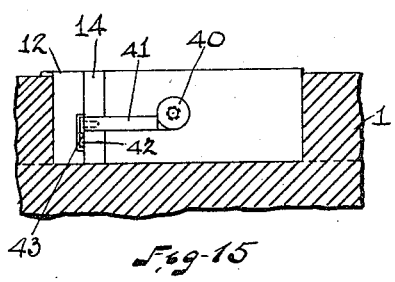
Figure 16:
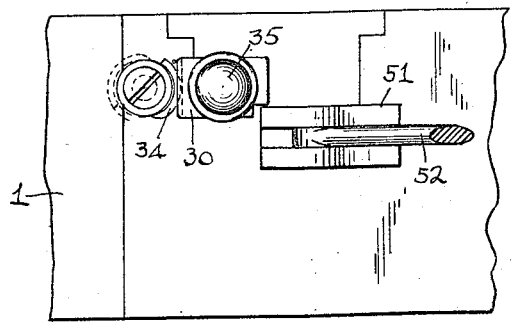
Figure 4:
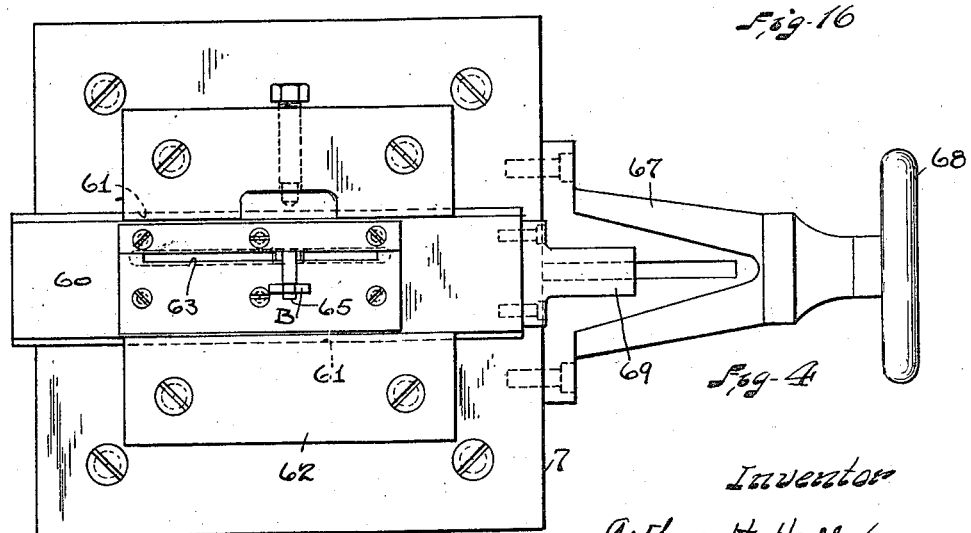

Figure 1 is a front elevational view of my improved driving press or punching mechanism, the same being designed as above indicated, for the manufacture of matrices; Fig. 2 is a plan view of the lower portion, or bed, of such machine, which includes a chuck for holding the matrix bars while being punched, along with various accessory mechanisms, as will be later set forth, the plane of the view being indicated by the line 2—2, Fig. 1, looking downwardly; Fig. 3 is a view similar to Fig. 2, but showing certain parts in a different operating position; Fig. 4 is a bottom plan view of the punch-head and holder, the view being taken on the same plane as Fig. 2, but looking upwardly; Fig. 5 is a side elevational view of the lower bed and chuck mechanism, with parts in section, as indicated by the line 5—5, Figs. 2 and 3; Fig. 6 is a vertical sectional view of a device associated with such chuck, designed to assist in feeding the blank matrices thereto, the plane of the section being indicated by the line 6—6, Figs. 2 and 3; Fig. 7 is a vertical sectional view of the bed of the machine with the chuck in coöperative relation with the punch-holder and punch, the plane of the section being indicated by the line 7—7, Figs. 2 and 3; Fig. 8 is a view similar to Fig. 7, but showing the parts in different operative position; Fig. 9 is a view likewise similar to Fig. 7, but showing the parts in still another operative position; Fig. 10 is a vertical sectional view of the bed, with the chuck thereon in coöperative relation with the punch-head, punch-holder and punch, corresponding with Fig. 7, but the plane of the section lying at right angles to the plane of said Fig. 7 as indicated by the line 10—10, Figs. 2 and 3; Fig. 11 is a view similar to Fig. 10, but showing the parts in a different operative position corresponding with that shown in Fig. 8; Fig. 12 is a view likewise similar to Fig. 10, but showing the parts in yet another operative position corresponding with that of Fig. 9; Fig. 13 is a section of a detail consisting of a stop for the chuck-actuating plunger, as indicated by the line 13—13, Figs. 2 and 3; Fig. 14 is a part elevation and part section showing a detail of the chuck face, the plane of the section being the same as that of Figs. 7, 8 and 9, but the parts being viewed in the opposite direction; Fig. 15 is an end elevation and partial section of the matrix feeding device, the plane of the section being indicated by the line 15—15, Fig. 6; Fig. 16 is an elevation of the front end of the holder, or magazine, for the blank matrices, from the inner end of which they are moved by said feeding device into position to be punched; Fig. 17 is a perspective view of a blank matrix-bar; Fig. 18 is a similar perspective view of such bar after it has been punched;

Fig. 19 is a perspective view of a punch; and Fig. 20 is a side elevation of a punched bar showing the method of gaging the strike of the punch.

In its general form, my improved matrix driving press or punching mechanism resembles an ordinary hydraulic press. Thus the bed 1 of the machine, which will be more particularly described later, is supported on a table-like top 2, carried by a vertically reciprocable piston 3 mounted in a cylinder 4 that rests on the base 5 of the machine. Inasmuch as the range of movement required for the operation of punching matrices is very short, removable blocks 6 are set under such table so as to limit the movement of the latter in a downward direction and support the same. The punch-head 7 is supported from the top member 8 of the general machine frame, which is connected with the base 5 by columns 9, four in number, as is usual in structures of this sort, so as to form a very strong, substantial frame in view of the heavy strains that are imposed upon it.

Attention will first be directed, in the matter of detailed description, to the chuck for holding the matrix-bars while they are being punched, such chuck, along with the supporting bed 1 and appurtenant parts, being shown in plan view in Figs. 2 and 3. One jaw of the chuck is in effect a rectangular recess 10 formed in the solid body of the bed itself, at the end of a longitudinal slot 11 which constitutes a slide-way for the other or movable jaw 12. To the rectangularly related faces of such fixed chuck jaw are fitted hardened steel plates 13 and 14, respectively, both of substantial character, while the inner end of the movable jaw 12 similarly carries a hardened steel block 15, so as to withstand wear and insure absolutely accurate results. The block thus carried by the movable jaw, is detachably secured thereto by a screw-fastening 16, so as to be interchangeable with other similar blocks that differ from each other merely in their thickness, the object being to provide a recess 17 between such block and the plate 14 which forms the opposite face of the fixed chuck jaw, that will have substantially the dimensions of the blank matrix A in which it is desired to form the character impression.

The direction of movement of the chuck jaw 12, it will be observed, is along a straight line that divides the angle between the two plates 13 and 14 equally, so that said jaw when moved inwardly, will clamp such blank matrix-bar in rectangularly related directions; that is, it will press it flat-wise against the one plate 14 of the fixed jaw, and end-wise against the other such plate 13.

The dimensions of the recess 17 are preferably so gaged as to cause the jaw to exert a greater pressure thus edge-wise of the matrix bar than transversely, or flat-wise, the object being to prevent any displacement of metal in the first-named direction when the punch is driven, the flow being confined to a lateral direction, although, of course, very slight, owing to the pressure of the jaws against the flat sides. The latter sides, however, can be trimmed or ground plain, much more readily than can the edges, and with much less likelihood of throwing the character struck in the matrix bar out of line.

The movable jaw 12 is normally held in retracted position by a heavy compression spring 20 in a recess 21 in the bed 1, said spring engaging with its outer end a pin 22 depending from such jaw, (see Figs. 2, 3 and 5). A set-screw 24 threaded in an adjacent portion of the bed 1 near the rear end of the jaw, is adapted to engage a shoulder 25 on the latter and thus form an adjustable stop preventing the retraction of the jaw more than a predetermined amount. Such amount is gaged to leave a space between the forward end of the jaw and the juxtaposed plate of the fixed jaw just sufficient to permit of a blank matrix A being slid therealong by the feeding mechanism to which attention will be directed later.

Actuation of the movable jaw 12 inwardly against said spring 20 is secured by means of a piston 26 mounted in a hydraulic cylinder 27 that is secured to the face of the bed 1 on which the jaw extends. By admitting water under pressure to this cylinder, the piston is forced inwardly, imparting a corresponding movement to the jaw 12 which may be held under any desired pressure against the fixed jaw 10, as will be obvious.

The blank matrices A, the general form of which in the present instance is indicated in the sectional views of the mechanism, Figs. 6, 7 and 10, as well as in the detached views of Figs. 17 and 18, are designed to be held in a trough-like magazine 30 that is adapted to be removably secured in a suitable recess 31 extending at right angles to the face of the fixed jaw 10, onto which is fitted the plate 14, the latter having an opening alined with the inner end of the trough so as to permit the blank matrices to be ejected therefrom into the space previously referred to as being left between such plate and the movable jaw in the retracted position of the latter. A plunger 32, slidably fitted in the magazine, and backed by a compression spring 33, tends to force the body of matrices forward to thus eject them successively into the space in question. The magazine is locked in the recess provided therefor in the bed by means of a pivotal latch 34, shown in elevation in Fig. 16. By turning such latch into the position shown in dotted outline, the trough may be withdrawn, and a fresh stock of blank matrices inserted therein, the plunger 32 being first drawn back by means of a handle 35, as will be readily understood.

In order to transfer or feed the successive matrices, as they are discharged into the space between the movable jaw 12 and the opposed face of the fixed jaw 10, a plunger 40 is mounted in the bed 1 of the machine so as to be reciprocable at right angles to the magazine 30, or in other words in a direction parallel with such face, such plunger being provided at its inner end with an arm 41 that carries a plate-like finger 42 adapted in one position of the plunger to entirely clear such trough, as shown in Fig. 7, but capable of moving across the end of the trough into the position shown in Fig. 8. The effect of such movement, provided a blank matrix A has been ejected in front of the finger, will obviously be to transfer the latter into position in front of the block 15 carried by the movable jaw 12; in other words, will leave such blank matrix in place to be pressed or clamped, as previously described, between the two jaws of the chuck when the movable jaw is closed on the fixed jaw. In order to permit such movement of the finger, the face of the movable jaw is transversely recessed as shown at 43 in Fig. 14.

The finger 42, it will be observed, extends in both directions from the arm 41, the longer extension being adapted to obstruct the end of the trough 30 in the position of said finger illustrated in Fig. 8, thus preventing the ejection of a fresh matrix blank until the operator is ready. The shorter extension of such finger, moreover, is likewise adapted to remain in front of the trough and similarly prevent the ejection of a fresh blank in the intermediate position of such finger shown in Fig. 9.

Plunger 40 is normally actuated inwardly by a compression spring 44, but may be moved outwardly by means of a knob 45 on its outer end, either the full distance shown in full lines in Fig. 2, or simply far enough to allow a pin 46 thereon to escape from a slot 47 in a tubular bearing 48, which also serves to hold the compression spring in place, so that by turning the plunger a trifle it will be held in the position shown in full lines in Fig. 3. Such last-named position corresponds with the position in which the forward extension of the finger 42 blocks the trough 30, while the fully withdrawn position of the plunger corresponds with the position of the finger illustrated in Fig. 8, in which a matrix has been moved into operative position in the chuck, while the longer extension of the finger blocks the trough. In other words, the trough is only entirely clear of the finger in the innermost position of the plunger in which the pin 46 engages the slot 47.

The bottom of the well-like recess 17 that is left between the block 15 on the movable jaw of the chuck, and the plate 14 of the fixed jaw, consists of a hardened steel plate 50 carried on the upper face of a substantial slide 51 that is reciprocable by means of a bell-crank lever 52 on the front face of the bed, as shown in Figs. 1, 2 and 3. The reason for the use of a hardened steel plate in this connection, and for the heavy character of the slide, is that the full force of the vertical compression stroke of the hydraulic plunger is, of course, taken by such plate. The plate normally occupies the position shown in Figs. 10 and 11, in which a matrix bar, positioned in the chuck as has just been described, is supported at the proper elevation to be engaged by the punch when the bed 1 of the machine is raised. Upon completion of the strike and the retraction of the movable chuck jaw 12, the slide 51 is also withdrawn, thus allowing the punched matrix to drop into the recess 53 in front of such slide, as shown in Fig. 12. Upon again moving the slide inwardly into its normal position, such matrix is shoved into the upper end of a passage 54, and discharged through the bottom of the bed.

The general form of the punch B employed in driving character impressions into the blank matrix-bars is well indicated in Figs. 7, 10 and 19, from which it will be noted that the lower end $b$ of the punch is formed to enter the recess $a$ in the opposed edge of the matrix bar, such recess being a characteristic feature of the particular bars in hand and it being understood that the face of the punch may be changed in form to suit the kind of matrix bar in hand. I have found where a character impression is thus formed by means of a punch instead of by being engraved, that considerable difficulty is encountered in forming an intaglio impression in the metal of the matrix bar, which will be of uniform depth throughout, as is necessary if the raised type character subsequently cast from such impression is to have a perfectly plane printing face. It does not suffice to have the punch face perfectly plane, for I have found that the finer the line being struck, the deeper the impression remains, whereas a relatively wide face on the punch, although impressed to the same depth in the material, will leave a relatively shallower strike. Accordingly, in forming the punch face of a character such, for example, as a capital C (see Fig. 19), I lap off the narrower portions of such character, as indicated in a somewhat exaggerated fashion in the figure in question. When such a die is impressed into the material of the blank, while the lapped-off portions do not penetrate as deeply as the broader portion, the result will be an intaglio impression having its bottom in substantially the same plane.

There will, of course, be a different punch for each character, and the body of such punch will correspond in its cross-sectional dimensions with those of the matrix, being just a trifle less, so that the punch may move freely in the well or recess in the bottom of which the matrix blank is held gripped between the chuck jaws. As a matter of fact, as explained before, it is the bed 1 of the machine, with such chuck jaws and matrix blank, that are moved relatively to the punch, rather than vice versa, the range of movement being slight, since it is only necessary to lower the blank sufficiently to allow the punch to clear the recess $a$ in such blank, and thus permit of the insertion of a second blank after the character impression has been struck in the first.

The upward movement of the bed of the machine carrying the blank, is limited by the engagement of the flat upper faces of the chuck jaws with a plate 60 secured to the under side of the head 7, and forming part of the means whereby the punch is secured to such head.

In order to adjust the depth of the strike, since the bed and the head thus occupy a fixed relation at the end of the punching stroke of the press, it is necessary to provide for the vertical adjustment of the punch. The plate 60, just referred to, is accordingly slidably held in ways 61 in a second plate 62 directly attached to the under-side of the head, said ways inclining slightly to the horizontal, as indicated in Figs. 7, 8 and 9. The first-named plate 60 is provided with an under-cut slot 63 adapted to receive and slidably hold block 64 of T-shape, to which in turn is attached the punch B by means of a screw 65 passing through the upper end of the same, and the depending portion of such block 64. Obviously if the slidable plate 60 be moved along its supporting ways 61 in the other plate, the punch and its supporting block being held against such movement by reason of the engagement of the former in the well 17 between the chuck jaws, such punch will be slightly raised or lowered, depending upon the direction of movement of said plate 60.

Such movement is effected by means of a threaded spindle 66 rotatably but longitudinally immovably held in a bracket 67 attached to the front face of the head 7. The outer end of such spindle is provided with a hand-wheel 68 to facilitate its rotation, while the threaded portion thereof engages with an upwardly projecting arm 69 on the plate. By means of such screw and the slight angle of the ways, it will obviously be possible to secure a very fine adjustment of the punch vertically in the well, and thus obtain a strike of exactly the depth desired in the production of any given character impression. By providing a micrometer scale (not shown) in connection with the wheel 68, or other movable part associated with the adjustment of the punch, the correct position of parts for any particular punch, once ascertained, can be readily returned to when the punch is used again, such correct position being empirically determined in the first instance. In other words, the character impression is struck in the blank matrix, and the depth of such impression is then carefully gaged by means of a suitable instrument, and the punch is thereupon adjusted, if necessary, until exactly the right depth has been obtained.

Although reference is thus made to the depth of the character impression, what I actually depend upon in manufacturing matrices with my present improved mechanism, is the distance between the bottom of such impression and the back of the bar. In other words, I have found that it is much more advantageous to measure the drive from the back of the bar instead of from its face. This distance $a'$ (Fig. 20) being preserved accurately, the distance $a^2$ between the front and back faces of the matrix bars may in turn be measured with reference to the same backs, and thus the depth of the impressions below the plane of such faces be likewise accurately determined. This method of gaging the location or depth of the character impressions in matrices of the kind in hand, has, so far as I am aware, never been attempted before.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. In mechanism of the class described, the combination with a relatively reciprocable head and bed; of a punch or the like mounted on said head; and a chuck mounted on said bed, said chuck including two relatively reciprocable jaws, one having an angular recess and the other a complementary angled face, the direction of relative movement between said chuck-jaws being on a line equidistant between the sides of such recess and said jaws being adapted to receive and laterally compress the article to be operated on between such recess and face.

2. In mechanism of the class described, the combination with a relatively reciprocable head and bed; of a punch or the like mounted on said head; and a chuck mounted on said bed, said chuck including a fixed jaw formed with a rectangular recess, and a jaw reciprocable on a line equidistant between the sides of such recess and having a rectangular face adapted to fit therein, a second recess being formed at the angle of one of said jaws of approximately the shape and size of the article to be operated on.

3. In mechanism of the class described, the combination with a relatively reciprocable head and bed; of a punch or the like mounted on said head; a chuck mounted on said bed, said chuck including a fixed jaw formed with a rectangular recess, a jaw reciprocable on a line equidistant between the sides of such recess, a second recess being formed at the angle of said movable jaw, and an interchangeable block secured in such second recess and adapted to partially fill the same so as to leave a space of approximately the shape and size of the particular article to be operated on.

4. In mechanism of the class described, the combination with a relatively reciprocable head and bed; of a punch or the like mounted on said head; and a chuck mounted on said bed, said chuck including two relatively reciprocable jaws, one having a rectangular recess and the other a rectangular face, the direction of relative movement between said chuck-jaws being on a line equidistant between the sides of such recess, a recess being formed at the angle of one of said jaws of approximately the shape and size of the article to be operated upon but more closely fitting such article in one transverse direction than another.

5. In mechanism of the class described, the combination with a relatively reciprocable head and bed; of a punch or the like mounted on said head; and a chuck mounted on said bed, said chuck including a fixed jaw formed with a rectangular recess, and a jaw reciprocable on a line equidistant between the sides of such recess and having a rectangular face adapted to fit therein, a second recess being formed at the angle of one of said jaws of approximately the shape and size of the article to be operated on, but more closely fitting such article in one transverse direction than another.

6. In mechanism of the class described, the combination with a relatively reciprocable head and bed; of a punch or the like mounted on said head; and a chuck mounted on said bed, said chuck including a fixed jaw formed with a rectangular recess, a jaw reciprocable on a line equidistant between the sides of such recess and having a rectangular face adapted to fit therein, resilient means normally retracting said reciprocable jaw, and power means for advancing the same.

7. In mechanism of the class described, the combination with a relatively reciprocable head and bed; of a punch or the like mounted on said head; and a chuck mounted on said bed, said chuck including a fixed jaw formed with a rectangular recess, a jaw reciprocable on a line equidistant between the sides of such recess and having a rectangular face adapted to fit therein, resilient means normally retracting said reciprocable jaw, an adjustable stop limiting the amount of such retraction, and power means for advancing said jaw.

8. In mechanism of the class described, the combination with a relatively reciprocable head and bed; of a punch or the like mounted on said head; a chuck mounted on said bed, said chuck including two relatively reciprocable jaws, one having an angular recess and the other a complementary angled face, the direction of relative movement between said chuck-jaws being on a line equidistant between the sides of such recess and said jaws being adapted to receive and laterally compress the article to be operated on between such recess and face; and means adapted to feed such an article between, and parallel with, two opposed faces of said jaws, when the latter are separated.

9. In mechanism of the class described, the combination with a relatively reciprocable head and bed; of a punch or the like mounted on said head; a chuck mounted on said bed, said chuck including a fixed jaw formed with a rectangular recess, and a jaw reciprocable on a line equidistant between the sides of such recess and having rectangularly related faces adapted to fit therein, a second recess being formed at the angle of said movable jaw of approximately the size of the article to be operated on; and means adapted to feed such articles, one at a time, between two opposed faces of said chuck-jaws into such second recess.

10. In mechanism of the class described, the combination with a relatively reciprocable head and bed; of a punch or the like mounted on said head; a chuck mounted on said bed, said chuck including two relatively reciprocable jaws, one having an angular recess and the other a complementary angled face, the direction of relative movement between said chuck-jaws being on a line equidistant between the sides of such recess and said jaws being adapted to receive and laterally compress the article to be operated on between such recess and face; means adapted to feed such an article between, and parallel with, two opposed faces of said jaws, when the latter are separated; and a magazine for such articles disposed transversely of the direction of the feed of such article between such opposed jaw faces.

11. In mechanism of the class described, the combination with a relatively reciprocable head and bed; of a punch or the like mounted on said head; a chuck mounted on said bed, said chuck including a fixed jaw formed with a rectangular recess, and a jaw reciprocable on a line equidistant between the sides of such recess and having rectangularly related faces adapted to fit therein, a second recess being formed at the angle of said movable jaw of approximately the size of the article to be operated on; a magazine for such articles opening onto one of the faces of said fixed chuck-jaw at a point spaced from such second recess; and means adapted to transfer such articles, one at a time, from such discharge point to such second recess.

12. In mechanism of the class described, the combination with a relatively reciprocable head and bed; of a punch or the like mounted on said head; a chuck mounted on said bed, said chuck including a fixed jaw formed with a rectangular recess, and a jaw reciprocable on a line equidistant between the sides of such recess and having rectangularly related faces adapted to fit therein, a second recess being formed at the angle of said movable jaw of approximately the size of the article to be operated on; a magazine for such articles opening onto one of the faces of said fixed chuck-jaw at a point spaced from such second recess; means tending to discharge such articles from said magazine; and means adapted to transfer such articles, one at a time, from such discharge point to such second recess, said last-named means being also adapted to control such discharge.

13. In mechanism of the class described, the combination with a relatively reciprocable head and bed; of a punch or the like mounted on said head; a chuch mounted on said bed, said chuck including a fixed jaw formed with a rectangular recess, and a jaw reciprocable on a line equidistant between the sides of such recess and having rectangularly related faces adapted to fit therein, a second recess being formed at the angle of said movable jaw of approximately the size of the article to be operated on; a magazine for such articles opening onto one of the faces of said fixed chuck-jaw at a point spaced from such second recess; means tending to discharge such articles from said magazine; and a member reciprocable between the opposed faces of said jaws adapted to transfer such articles, one at a time, from such discharge point to such second recess, said member being also adapted to close said magazine to prevent such discharge.

14. In mechanism of the class described, the combination with a relatively reciprocable head and bed; of a punch or the like mounted on said head; a chuck mounted on said bed, said chuck including two relatively reciprocable jaws, one having an angular recess and the other a complementary angled face, the direction of relative movement between said chuck-jaws being on a line equidistant with the sides of such recess and said jaws being adapted to receive and laterally compress the article to be operated on between such recess and face; and a movable member adapted in one position to support such article thus between such face and recess and in another position to allow the same to drop from therebetween.

15. In mechanism of the class described, the combination with a relatively reciprocable head and bed; of a punch or the like mounted on said head; a chuck mounted on said bed, said chuck including two relatively reciprocable jaws, one having an angular recess and the other a complementary angled face, the direction of relative movement between said chuck-jaws being on a line equidistant between the sides of such recess; and a reciprocable plate in said bed located below said jaws and adapted in one position to support the article to be operated upon and in another position to drop such article.

16. In mechanism of the class described, the combination with a relatively reciprocable head and bed; of a punch or the like mounted on said head; a chuck mounted on said bed, said chuck including a fixed jaw formed with a rectangular recess, and a jaw reciprocable on a line equidistant between the sides of such recess and having a rectangular face adapted to fit therein, a second recess being formed at the angle of said movable jaw of approximately the size of the article to be operated on; and a plate movable below and transversely of such second recess, said plate being adapted in one position to support such article in such recess and in another position to allow the same to drop therefrom.

17. In mechanism of the class described, the combination with a relatively reciprocable head and bed; of a punch or the like mounted on said head; a chuck mounted on said bed, said chuck including two relatively reciprocable jaws, one having an angular recess and the other a complementary angled face, the direction of relative movement between said chuck-jaws being on a line equidistant between the sides of such recess and said jaws being adapted to receive and laterally compress the article to be operated on between such recess and face; means adapted to feed such an article between and parallel with two opposed faces of said jaws when the latter are separated; and a movable member adapted in one position to support such article thus between such face and recess and in another position to allow the same to drop from therebetween.

18. In mechanism of the class described, the combination with a relatively reciprocable head and bed; of a punch or the like mounted on said head; a chuck mounted on said bed, said chuck including a fixed jaw formed with a rectangular recess, and a jaw reciprocable on a line equidistant between the sides of such recess and having a rectangular face adapted to fit therein, a second recess being formed at the angle of said movable jaw of approximately the size of the article to be operated on; means adapted to feed an article between, and parallel with, two opposed faces of said jaws when the latter are separated; and a plate movable below and transversely of such second recess, said plate being adapted in one position to support such article in such recess, and in another position to allow the same to drop therefrom.

19. In mechanism of the class described, the combination with a relatively reciprocable head and bed; of a chuck mounted on said bed, said chuck including two relatively reciprocable jaws, one having an angular recess and the other a complementary angled face, the direction of relative movement between said chuck-jaws being on a line equidistant between the sides of such recess; and a punch secured to said head and depending between such recess and face.

20. In mechanism of the class described, the combination with a relatively reciprocable head and bed; of a chuck mounted on said bed, said chuck including two relatively reciprocable jaws, one having an angular recess and the other a complementary angle face, the direction of relative movement between said chuck-jaws being on a line equidistant between the sides of such recess; and a punch secured to said head and depending between such recess and face, said punch being vertically adjustable relatively to said head without disturbing its position thus between such recess and face.

21. In mechanism of the class described, the combination with a relatively reciprocable head and bed; of a chuck mounted on said bed and including relatively reciprocable jaws adapted to grip the article to be operated upon; inclined ways on said head; a plate reciprocably held in such ways; and a punch secured to said plate so as to be adjustable in a direction parallel with said ways.

22. In mechanism of the class described, the combination with a relatively reciprocable head and bed; of a chuck mounted on said bed and including relatively reciprocable jaws adapted to grip the article to be operated upon; inclined ways on said head; a plate reciprocably held in such ways and formed with an undercut slot extending parallel with said ways; a block slidably supported in such slot; and a punch detachably secured to said block.

23. In mechanism of the class described, the combination with a relatively reciprocable head and bed; of a chuck mounted on said bed, said chuck including two relatively reciprocable jaws, one having an angular recess and the other a complementary angled face, the direction of relative movement between said chuck-jaws being on a line equidistant between the sides of such recess, and said jaws being adapted to receive and laterally compress the article to be operated on between such recess and face; inclined ways on said head; a plate reciprocably held in such ways; and a punch secured to said plate so as to be adjustable in a direction parallel with said ways, said punch depending between such recess and face.

24. In mechanism of the class described, the combination with a relatively reciprocable head and bed; of a chuck mounted on said bed, said chuck including two relatively reciprocable jaws, one having an angular recess and the other a complementary angled face, the direction of relative movement between said chuck-jaws being on a line equidistant between the sides of such recess, and said jaws being adapted to receive and laterally compress the article to be operated on between such recess and face; inclined ways on said head; a plate reciprocably held in such ways and formed with an undercut slot extending parallel with said ways; a block slidably supported in such slot; and a punch detachably secured by such block and depending between such recess and face.

Signed by me, this 10th day of August, 1914.

ARTHUR H. HEDLY.

Attested by—
 LOUIS J. HILLEBRAND,
 HENRY BINDER.

Copies of this patent may be obtained for five cents each, by addressing the "Commissioner of Patents, Washington, D. C."